US008751990B2

(12) United States Patent
Standfield et al.

(10) Patent No.: US 8,751,990 B2
(45) Date of Patent: Jun. 10, 2014

(54) SYSTEM FOR DETERMINING MEDIAN VALUES OF VIDEO DATA

(75) Inventors: Matthew R. Standfield, Dallas, TX (US); Jim D. Allen, Tulsa, OK (US); Juan Esteban Flores, Owasso, OK (US); Michael O'Neal Fox, Bixby, OK (US); Deepak Prasanna, Rockwall, TX (US); Matthew P. DeLaquil, Rockwall, TX (US)

(73) Assignee: L3 Communications Integrated Systems, L.P., Greenville, TX (US)

( * ) Notice: Subject to any disclaimer, the term of this patent is extended or adjusted under 35 U.S.C. 154(b) by 1541 days.

(21) Appl. No.: 12/340,166

(22) Filed: Dec. 19, 2008

(65) Prior Publication Data

US 2010/0161695 A1 Jun. 24, 2010

(51) Int. Cl.
*G06F 17/50* (2006.01)

(52) U.S. Cl.
USPC .......................................... 716/116; 708/202

(58) Field of Classification Search
CPC .......... G06F 17/30; G06F 17/00; G06F 17/50
See application file for complete search history.

(56) References Cited

U.S. PATENT DOCUMENTS

| 4,644,495 | A | * | 2/1987 | Crane | 345/572 |
| 5,448,496 | A | * | 9/1995 | Butts et al. | 716/116 |
| 5,666,516 | A | * | 9/1997 | Combs | 711/163 |
| 5,761,698 | A | * | 6/1998 | Combs | 711/100 |
| 5,765,197 | A | * | 6/1998 | Combs | 711/164 |
| 5,854,752 | A | * | 12/1998 | Agarwal | 716/116 |
| 6,122,716 | A | * | 9/2000 | Combs | 711/163 |
| 6,173,358 | B1 | * | 1/2001 | Combs | 711/100 |
| 6,223,083 | B1 | * | 4/2001 | Rosar | 607/60 |
| 6,295,473 | B1 | * | 9/2001 | Rosar | 607/60 |
| 6,567,969 | B1 | * | 5/2003 | Agrawal et al. | 326/38 |
| 6,707,805 | B2 | * | 3/2004 | Ozluturk et al. | 370/335 |
| 6,721,301 | B2 | * | 4/2004 | Ozluturk et al. | 370/342 |
| 6,754,380 | B1 | * | 6/2004 | Suzuki et al. | 382/156 |
| 6,788,662 | B2 | * | 9/2004 | Ozluturk et al. | 370/335 |
| 6,816,473 | B2 | * | 11/2004 | Ozluturk et al. | 370/335 |

(Continued)

OTHER PUBLICATIONS

C. Tanougast, Y. Berviller, P. Brunet, S. Weber, H. Rabah, Temporal partitioning methodology optimizing FPGA resources for dynamically reconfigurable embedded real-time system, Microprocessors and Microsystems, vol. 27, Issue 3, Apr. 25, 2003, pp. 115-130, ISSN 0141-9331, 10.1016/S0141-9331(02)00102-3.*

(Continued)

*Primary Examiner* — Farhan Syed
(74) *Attorney, Agent, or Firm* — Hovey Williams LLP

(57) ABSTRACT

A system for determining the median of a plurality of data values comprises a plurality of field programmable gate arrays (FPGA), a plurality of inter FPGA links, an input router, a plurality of median modules, and a plurality of output transfer modules. Each FPGA includes a plurality of configurable logic elements and configurable storage elements from which the other components are formed. The inter FPGA link allows communication from one FPGA to another. The input router receives the plurality of data values and creates a plurality of data streams. The median module receives at least one data stream, increments a plurality of counters corresponding to a single data value within the range of data values, and determines the median by accumulating the contents of each counter. The output transfer module transfers the median to an external destination along with performance statistics of the determination of the median.

18 Claims, 6 Drawing Sheets

(56) References Cited

U.S. PATENT DOCUMENTS

| | | | | |
|---|---|---|---|---|
| 6,831,453 | B2* | 12/2004 | Johnstone et al. | 324/102 |
| 6,940,840 | B2* | 9/2005 | Ozluturk et al. | 370/335 |
| 6,941,539 | B2* | 9/2005 | Hammes | 716/121 |
| 6,987,401 | B1* | 1/2006 | Langhammer et al. | 326/40 |
| 7,020,111 | B2* | 3/2006 | Ozluturk et al. | 370/335 |
| 7,072,380 | B2* | 7/2006 | Ozluturk et al. | 375/141 |
| 7,123,600 | B2* | 10/2006 | Ozluturk et al. | 370/335 |
| 7,312,856 | B2* | 12/2007 | Flockencier | 356/5.01 |
| 7,327,405 | B1* | 2/2008 | Lowe et al. | 348/663 |
| 7,535,874 | B2* | 5/2009 | Ozluturk et al. | 370/335 |
| 7,706,332 | B2* | 4/2010 | Ozluturk et al. | 370/335 |
| 7,929,498 | B2* | 4/2011 | Ozluturk et al. | 370/335 |
| 7,940,844 | B2* | 5/2011 | Lai et al. | 375/240.16 |
| 8,031,963 | B2* | 10/2011 | Sullender | 382/260 |
| 8,225,259 | B1* | 7/2012 | Mendel et al. | 716/116 |
| 8,543,955 | B1* | 9/2013 | Kaptanoglu et al. | 716/116 |
| 8,595,671 | B2* | 11/2013 | He | 716/116 |
| 2003/0094935 | A1* | 5/2003 | Johnstone et al. | 324/76.15 |
| 2003/0154458 | A1* | 8/2003 | Butts et al. | 716/17 |
| 2004/0161162 | A1* | 8/2004 | Hammes | 382/262 |
| 2004/0170243 | A1* | 9/2004 | Old | 375/372 |
| 2006/0005090 | A1* | 1/2006 | Langhammer et al. | 714/725 |
| 2009/0128619 | A1* | 5/2009 | Mash | 348/40 |
| 2009/0135195 | A1* | 5/2009 | Chen et al. | 345/589 |
| 2009/0219380 | A1* | 9/2009 | Cable | 348/40 |
| 2009/0219591 | A1* | 9/2009 | Cable | 359/9 |
| 2009/0257672 | A1* | 10/2009 | Sullender | 382/260 |
| 2009/0322738 | A1* | 12/2009 | Cable | 345/419 |
| 2010/0165429 | A1* | 7/2010 | Buckley et al. | 359/9 |
| 2011/0010509 | A1* | 1/2011 | Flores et al. | 711/154 |

OTHER PUBLICATIONS

Maheshwari, R. FPGA implementation of median filter, VLSI Design, 1997. Proceedings., Tenth International Conference on, Jan. 4-7, 1997, pp. 523-524.*

Bates, G.L. FPGA implementation of a median filter, TENCON '97. IEEE Region 10 Annual Conference. Speech and Image Technologies for Computing and Telecommunications., Proceedings of IEEE, Dec. 2-4, 1997, pp. 437-440 vol. 2.*

Swenson, R.L. A hardware FPGA implementation of a 2D median filter using a novel rank adjustment technique, Image Processing and Its Applications, 1999. Seventh International Conference on (Conf. Publ. No. 465), Jul. 1999, pp. 103-106 vol. 1.*

Fahmy, S.A. Novel FPGA-based implementation of median and weighted median filters for image processing, Field Programmable Logic and Applications, 2005. International Conference on, Aug. 24-26, 2005, pp. 142-147.*

Box, B. Field programmable gate array based reconfigurable preprocessor, FPGAs for Custom Computing Machines, 1994. Proceedings. IEEE Workshop on, Apr. 10-13, 1994, pp. 40-48.*

Narendra, Patrenahalli M. A Separable Median Filter for Image Noise Smoothing, Pattern Analysis and Machine Intelligence, IEEE Transactions on, Jan. 1981, pp. 20-29.*

P. Zicari, P. Corsonello, and S. Perri, "A high flexible Early-Late Gate Bit Synchronizer in FPGA-Based Software Degined Radios," IEEE, 4th European Conference on Circuits and Systems for Communications, 2008, pp. 252-255.*

* cited by examiner

SYSTEM FOR DETERMINING MEDIAN VALUES OF VIDEO DATA

BACKGROUND OF THE INVENTION

1. Field of the Invention

Embodiments of the present invention relate to data processing. More particularly, embodiments of the present invention relate to determining the median value of a frame of video data utilizing a field programmable gate array system.

2. Description of the Related Art

A digital video image generally comprises a plurality of picture elements, commonly known as pixels, that are arranged in an array. For common video applications, such as television or digital photography, the array of pixels is rectangular and may be expressed as X×Y, although square arrays are also possible. The entire array of pixels may be known as a frame. Each pixel in the frame may possess one or more video characteristic values, such as a brightness value or a color value. In order to further process the video image data for one or more objects of interest within the frame, it is usually necessary to isolate the objects. The median of the characteristic value of all the pixels within the frame may be used to isolate the objects.

Traditional approaches to determining the median have required that the characteristic values of all the pixels in the frame be sorted in either ascending or descending order. In this case, the sort creates an array of X×Y elements, each with a characteristic value. If X×Y=N, then the array includes N elements, each with a characteristic value. As is commonly known in statistics, the median is the value of the N/2 sorted element; or the higher, the lower, or the average of two potential median values if the array contains an even number of elements. This type of sort may take a time on the order of N·log(N). Using traditional computer processing techniques, wherein tasks may be performed in software executed in a serial fashion, the sort may take longer than it takes to capture one frame of video data, particularly as N gets large. Furthermore, moving image video requires that many successive frames of video data are captured every second (standard rates include 24 frames per second (fps), 30 fps, and 120 fps). A problem may occur if a first frame of video data is not sorted by the time a second frame of data is captured and ready for sort. Data may be lost and errors may occur, with the result that performance may be sacrificed. Therefore, in order to avoid or reduce errors, fewer frames of data may be sorted, such as every second or third frame of data.

SUMMARY OF THE INVENTION

Embodiments of the present invention solve the above-mentioned problems and provide a distinct advance in the art of data processing. More particularly, embodiments of the invention provide a system for determining a median of a characteristic value of a plurality of picture elements (pixels) in a video frame utilizing a plurality of field programmable gate arrays (FPGAs).

Various embodiments of the system of the present invention include a plurality of FPGAs, a plurality of inter FPGA links, an input router, a plurality of median modules, and a plurality of output transfer modules.

The FPGAs include a plurality of configurable logic elements and a plurality of configurable storage elements, from which the other components in the system may be formed. Each FPGA includes at least one inter FPGA link, which may allow communication from one FPGA to another FPGA.

The input router may receive a plurality of data values corresponding to a characteristic of the plurality of pixels from an external source. The input router may transmit a plurality of data streams, each stream containing at least a portion of the data values.

The median module may receive at least one stream of data values from the input router. The median module may include at least one dual-port memory element, an address generator, an accumulator, a comparator, and an address register.

The dual-port memory element may be coupled to an adder, wherein the adder may be configured to add one to the contents of each address of the dual-port memory element. The address generator may be coupled to an address bus of the dual-port memory element and configured to generate each address of the dual-port memory element in sequential order. The accumulator may be coupled to a data bus of the dual-port memory element and configured to accumulate the contents of each address of the dual-port memory element in sequential order. The comparator may be configured to compare the contents of the accumulator with the total number of the plurality of data values divided by two and to generate a signal if the contents of the accumulator is greater than or equal to the total number of the plurality of data values divided by two. The address generator may be coupled to the comparator and configured to determine the median upon receipt of the signal from the comparator.

The output transfer module may be configured to transfer the median to an external destination along with performance statistics of the determination of the median.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
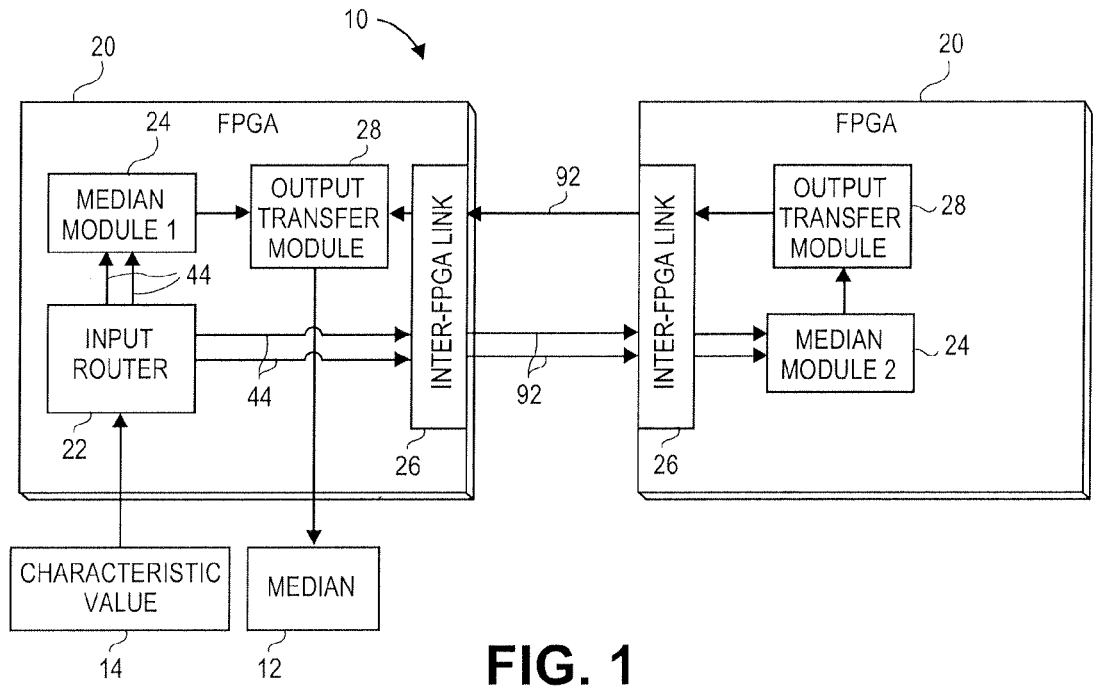
FIG. 1 is a block diagram of a system for determining the median of a frame of video data that is constructed in accordance with various embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 2:
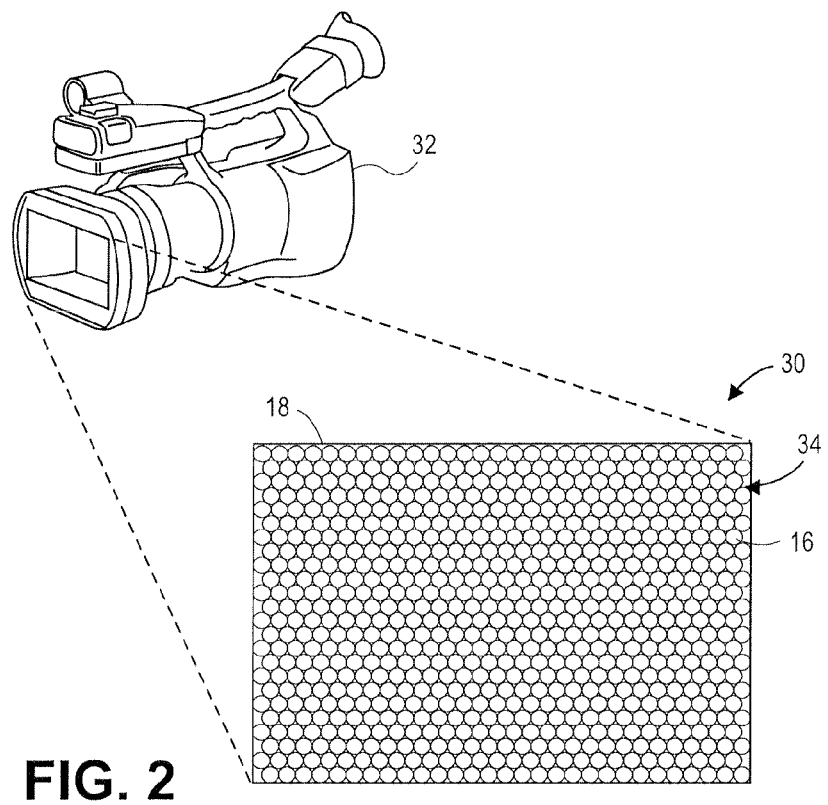
FIG. 2 is a schematic diagram of a video capture device that includes a video sensor with a plurality of picture elements (pixels)

A system 10 for ascertaining a median 12 of a characteristic value 14 of a plurality of picture elements (pixels) 16 in a video frame 18 as constructed in accordance with various embodiments of the current invention is shown in FIGS. 1 and 2. The system 10 may broadly comprise one or more field-programmable gate array (FPGAs) 20, an input router 22, a median module 24, an inter FPGA link 26, and an output transfer module 28.

The video frame 18, as seen in FIG. 2, may generally represent a video sensor 30 from a video capture device 32, such as a digital video camera (e.g., a camcorder) or a digital photography camera. In the case of the digital video camera, the video sensor 30 may capture successive frames of video images at standard rates, such as 24 frames per second (fps), 30 fps, or 100 fps. In the case of the digital photography camera, the video sensor 30 may capture a single frame 18 in a given time period or may capture multiple frames 18, but generally at a lower rate than the video camera.

The video sensor 30 may include one or more commonly known video sensors, such as a charge-coupled device (CCD) or a complementary metal-oxide semiconductor (CMOS) sensor. Generally, the video sensor 30 includes a plurality of pixels 16 arranged in an array 34. As seen in FIG. 2, the array 34 is often rectangular, although it may also be square. When the array 34 is exposed to a subject of interest, each pixel 16 captures a certain amount of light. Accordingly, each pixel 16 stores one or more values related to a characteristic of the light, such as the color, the brightness, etc.

Typically, the images captured by the sensor 30 are displayed on a screen or monitor, or printed on paper, or a similar medium. However, before the image is displayed or printed, it may be desirable to further process, enhance, or modify one or more objects of interest in the image. As a result, it may be necessary to isolate the objects. The median 12 of the characteristic value 14 of all the pixels 16 within the frame 18 may be used to isolate the objects.

The median 12, which is known as the value of the N/2 element of N sorted elements, is generally ascertained by sorting or at least partially sorting the characteristic values of all the pixels 16 within the frame 18 in either ascending or descending order. The system 10 of the present invention applies an algorithm 36 to the array of pixel 16 values in the frame 18, as discussed in more detail below.

Figure 3A:
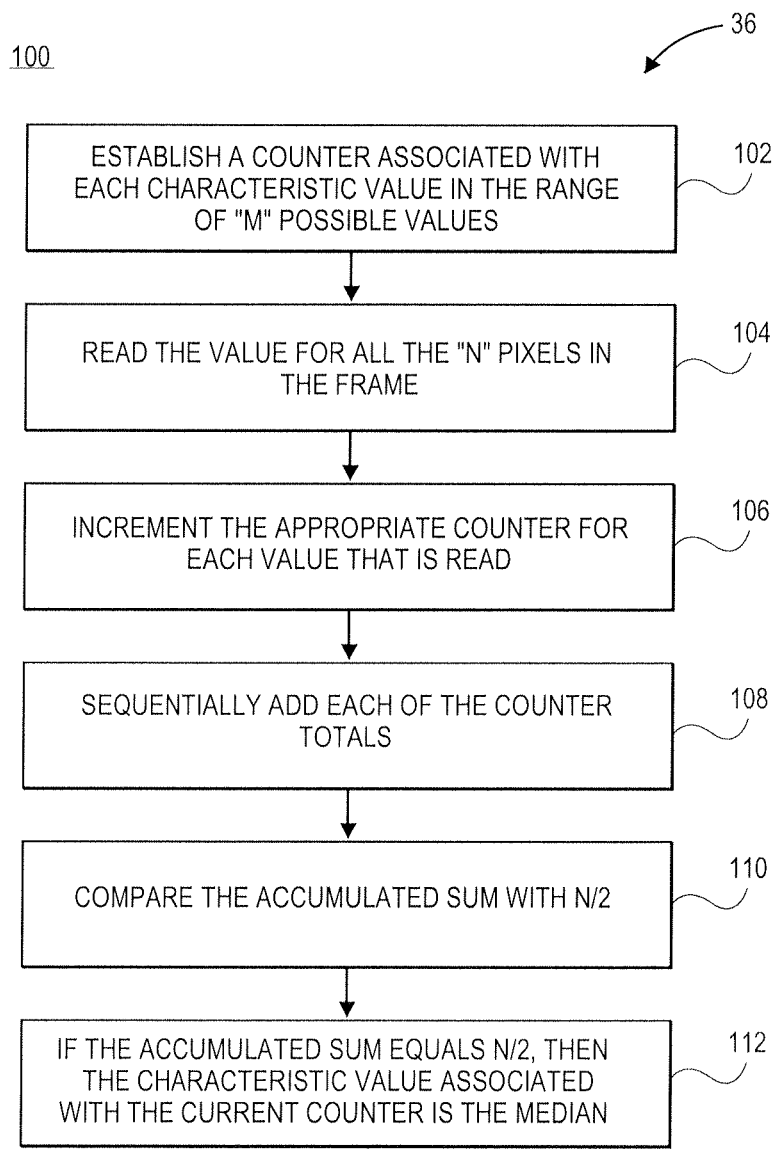
FIG. 3A is a flow diagram of at least some of the steps performed in algorithm to determine the median.
Figure 3B:
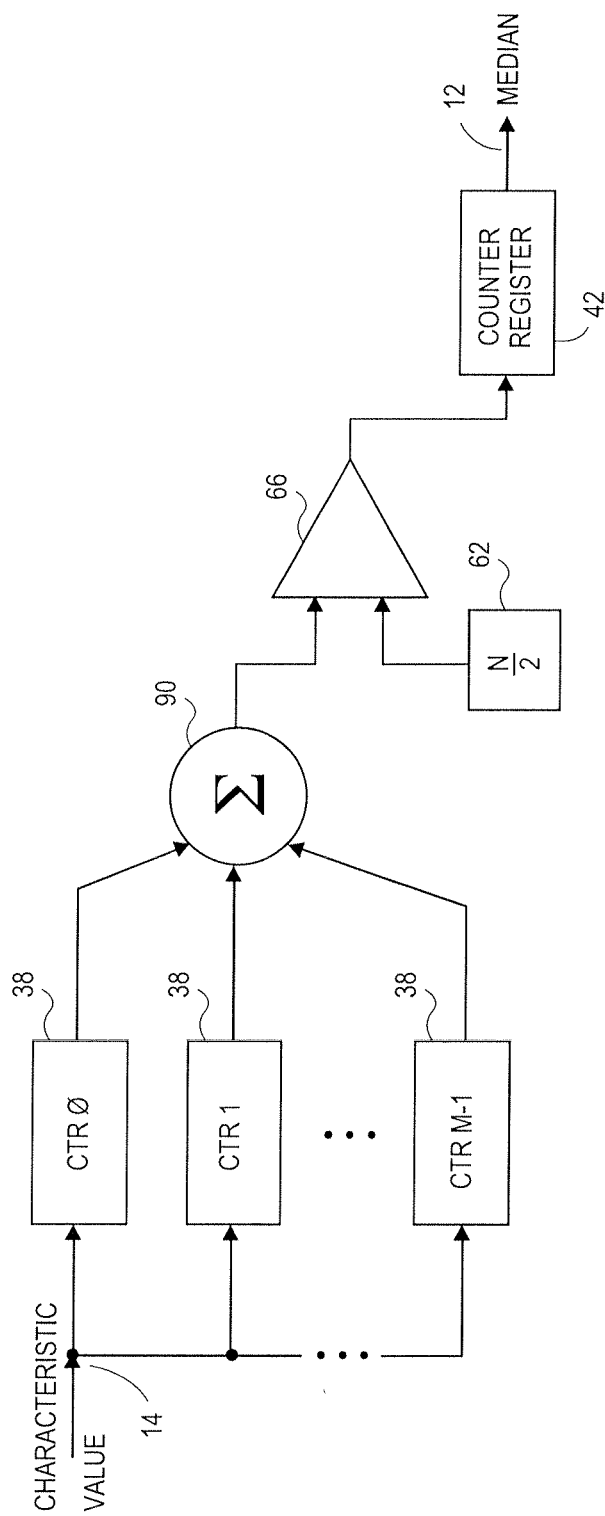
FIG. 3B is a block diagram of components that may perform the algorithm.

Generally, the characteristic value 14 of each pixel 16 is stored as a fixed-point number, which implies a fixed range for the characteristic value 14. For example, the characteristic value 14 may be stored as a fixed-point binary number in sixteen bits of storage. Thus, the range of the characteristic value 14 is 0-65,535. The algorithm 36 takes advantage of this a priori knowledge by only counting occurrences of each of these values without keeping track of which pixel produced the value. At least some of the steps that are performed for the algorithm 36 are depicted in a flow diagram 100 of FIG. 3A. Accompanying the flow diagram 100 is a block diagram, shown in FIG. 3B, depicting relevant generalized blocks that are used in the algorithm 36. The steps as shown in FIG. 3A do not imply a particular order of execution. Some steps may be performed concurrently instead of sequentially, as shown. Additionally, some steps may be performed in reverse order from what is shown in FIG. 3A.

In connection with step 102, a counter 38 may be established and associated with each characteristic value 14 in the range of possible values. In general, there may be M counters 38, that are numbered 0 through M-1. In the example mentioned above, there are sixteen bits to store the characteristic value 14 with a range of 0-65,535. Thus, there are 65,536 counters that are numbered 0 through 65,535.

In connection with step 104, the values for all of the pixels 16 in the array 34 are read. If the video sensor 30 is configured to have X×Y pixels 16 and X×Y=N, then there are N total pixels 16 in the array 34. To continue the example, the video sensor 30 may include $2^{11} \times 2^9$ pixels 16. As a result, $N = 2^{11} \times 2^9 = 2^{20}$. Thus, there are $2^{20}$ pixels 16 in the array 34, each pixel 16 with a characteristic value 14 from 0-65,535. The characteristic value 14 from each pixel 16 in the array 34 is read sequentially.

In connection with step 106, the appropriate counter 38 is incremented for each value that is read. Thus, if the value of the first pixel 16 is 39,050, then counter number 39,050 has a count total of 1, while all the other counters 38 have a total of 0.

In connection with step 108, after all the pixel 16 values have been read and the appropriate counters 38 have been incremented, then the totals from each counter 38 are accumulated with an accumulator 40 in sequential order.

In connection with step 110, after each counter 38 is added, the accumulated sum from the accumulator 40 is compared with N/2 to see if half the pixels 16 have been counted yet. In this example, the accumulated sum is compared with $2^{19}$. At the same time that each counter 38 is added to the accumulated total, a counter register 42 that keeps track of the current number of the counter is incremented when each addition occurs.

In connection with step 112, if the accumulated sum equals N/2, the number of the most recently added counter 38, as indicated by the counter register 42, is the median 12 value. Thus, if after adding the contents of counter number 51,267, for example, to the accumulated sum, the sum is equal to or is greater than $2^{19}$, then the median 12 of the pixel characteristic value 14 is 51,267.

Figure 4:
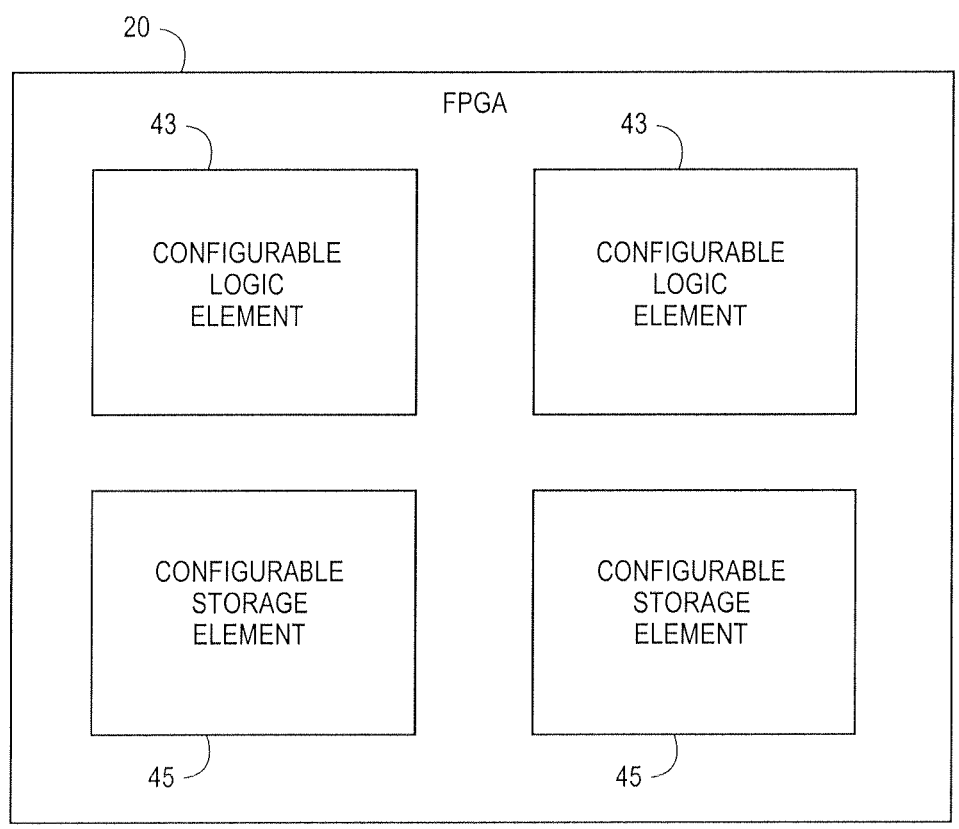
FIG. 4 is a block diagram of a field programmable gate array.

Referring back to the system 10, as shown in FIG. 1, that may perform various steps of the algorithm 36, the FPGA 20 generally provides the resources to implement the input router 22, the median module 24, the inter FPGA link 26, and the output transfer module 28. The FPGA 20, as seen in FIG. 4, may include configurable logic elements 43 or blocks, such as standard gate array components that include combinational logic gates (e.g., AND, OR, and NOT) and latches or registers, programmable switch and interconnect networks, configurable storage elements 45 such as random-access memory (RAM) components, and input/output (I/O) pads. The FPGA 20 may also include specialized functional blocks such as arithmetic/logic units (ALUs) that include high-performance adders and multipliers, or communications blocks for standardized protocols. An example of the FPGA 20 is the Xilinx Virtex™ series, particularly the Virtex™2Pro FPGA, from Xilinx, Inc. of San Jose, Calif.

The FPGA 20 may be programmed in a generally traditional manner using electronic programming hardware that couples to standard computing equipment, such as a workstation, a desktop computer, or a laptop computer. The functional description or behavior of the circuitry may be programmed by writing code using a hardware description language (HDL), such as very high-speed integrated circuit hardware description language (VHDL) or Verilog, which is then synthesized and/or compiled to program the FPGA 20. Alternatively, a schematic of the circuit may be drawn using a computer-aided drafting or design (CAD) program, which is then converted into FPGA 20 programmable code using electronic design automation (EDA) software tools, such as a schematic-capture program. The FPGA 20 may be physically programmed or configured using FPGA programming equipment, as is known in the art.

The input router 22 generally receives one frame 18 of video data from an external source. In various embodiments, the input router 22 may receive a plurality of video data frames 18 from various external sources. The input router 22 may split the frame 18 of video data into one or more data streams 44 and forward the streams 44 to a plurality of median modules 24. The split of the frame 18 may be executed as allowed by FPGA 20 resources or by throughput performance demands. In general, the input router 22 may split the video data from one frame 18 into an arbitrary number of streams 44 because the algorithm 36 allows for the median 12 to be ascertained in a parallel fashion as discussed in more detail below.

The input router 22 may include one or more of the following: multiplexers, demultiplexers, storage registers or buffers, shift registers, other serial-deserializer (SERDES) components, and combinations thereof, and may also be implemented through one or more code segments of an HDL. The input router 22 may further include various control logic elements, such as finite state machines, to control the flow of the data streams 44 to the median modules 24.

The median module 24 generally receives one or more data streams 44 and determines the median 12 of the characteristic value 14 from one frame 18 of video data. In various other embodiments, the median module 24 may receive only a portion of the video data from one frame 18, and may communicate with other median modules 24 to determine the median 12 of the entire frame 18. The median module 24 performs a pseudo sort of the characteristic values 14 by incrementing the counter 38 associated with each characteristic value 14, wherein the counters 38 are in a sorted order. Since the counters 38 are implemented using random access storage elements, described in more detail below, the counters 38 are automatically sorted.

The median module 24 may operate in one of two modes. The first mode is the data collection mode in which the median module 24 receives all the data from one frame 18 and properly increments the plurality of counters 38, as described in step 104 and step 106 above. The second mode is the data analysis mode in which the median module 24 sequentially adds the total from each counter 38, compares the accumulated sum with N/2 pixel values, and if the accumulated sum is equal to or greater than N/2, determines the median 12, as discussed in step 108, step 110, and step 112 above.

Figure 5:
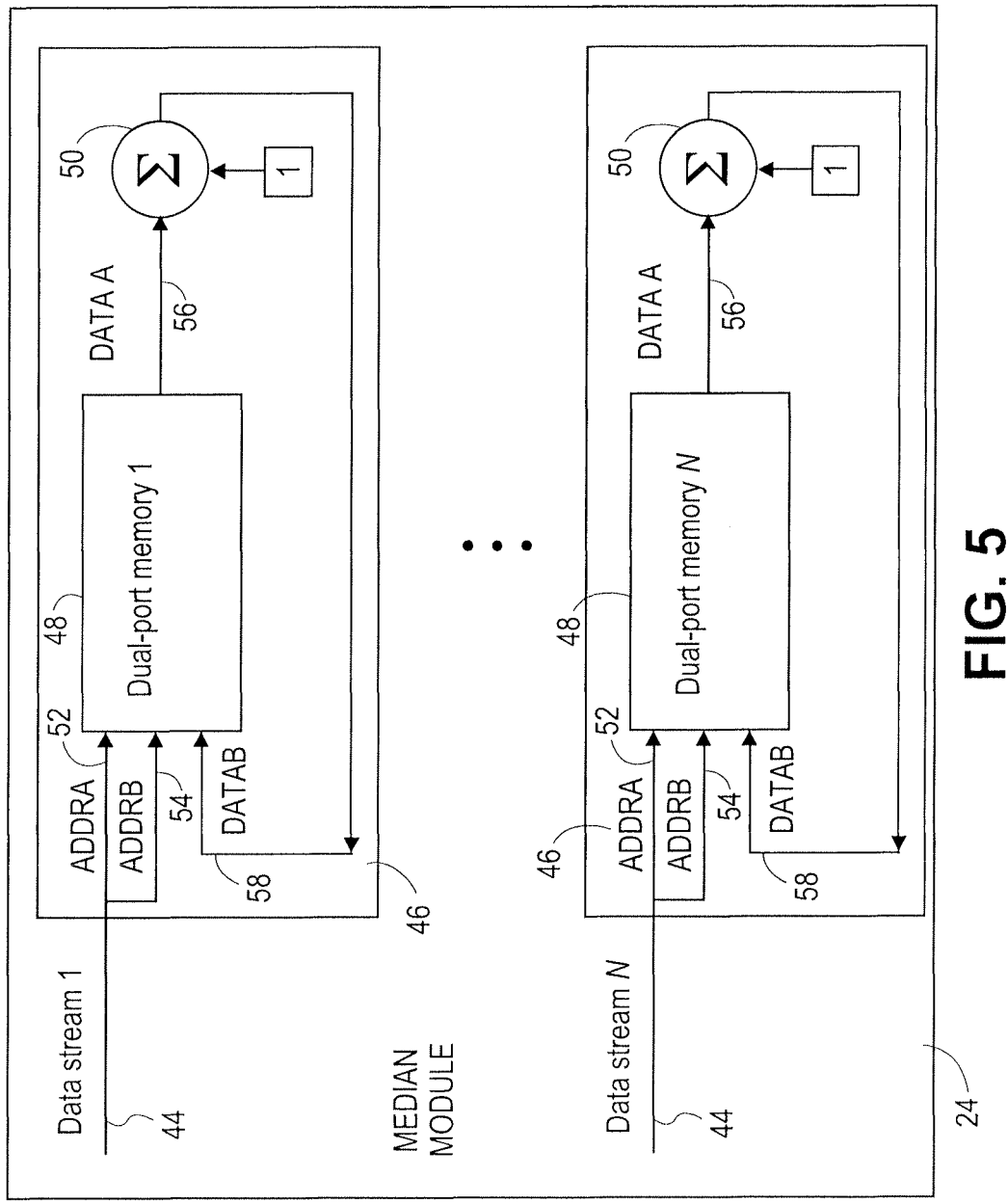
FIG. 5 is a block diagram of a median module that is operating in data collection mode.

As seen in FIG. 5, when in collection mode, the median module 24 may include one or more combinational counter units 46, which provides the functional equivalent of the plurality of counters 38 described above. Each combinational counter unit 46 may include a dual-port memory element 48 coupled with a counting adder 50. In other embodiments, the combinational counter unit 46 may include a plurality of registers or other general storage elements. The median module 24 may further include various control logic elements, such as finite state machines, to control the flow of data within the median module 24 and to establish the timing of data being stored in and retrieved from the dual-port memory element 48.

The dual-port memory element 48 may include a dual-port random-access memory (RAM) component, as is known in the art. The dual-port RAM component may include a built-in unit of the FPGA 20, such as the Block RAM, or may be composed from discrete memory elements available in the FPGA 20, and may further be implemented through one or more code segments of an HDL. The dual-port memory element 48 may include a first address bus 52, a second address bus 54, a first data bus 56, and a second data bus 58. The dual-port memory element 48 may further include control lines, such as read and write, and enable lines that are not discussed herein but function as is known in the art. Generally, the first address bus 52 and the first data bus 56 form the "A" ports of the dual-port memory element 48, and the second address bus 54 and the second data bus 58 form the "B" ports of the dual-port memory element 48.

The dual-port memory element 48 may function as is generally known. Data present on the first data bus 56 may get written to the address pointed to by the first address bus 52 during a write operation. Likewise for the second data bus 58 and the second address bus 54. Data stored in the address pointed to by the first address bus 52 may be loaded onto the first data bus 56 during a read operation. Likewise for the second address bus 54 and the second data bus 58.

The counting adder 50 generally adds two numbers together to produce a sum, as is known in the art. The counting adder 50 may include one or more adding units and may be formed from combinational logic, or arithmetic blocks such as half adders, full adders, carry look ahead adders, or other generally known adders. Furthermore, the counting adder 50 may include a built-in adder component of the FPGA 20, and may further be implemented through one or more code segments of an HDL.

The dual-port memory element 48 may couple with the counting adder 50 as shown in FIG. 5 to form the combinational counter unit 46. The first address bus 52 may be coupled with the second address bus 54 such that each line of the first address bus 52 couples with the appropriate corresponding line of the second address bus 54, with the result that the A port and the B port of the dual-port memory element 48 point to the same address. In addition, the combination of the first address bus 52 and the second address bus 54 is coupled to the input data stream 44. The first data bus 56 is coupled to one input of the counting adder 50. The other input of the counting adder 50 always receives a "1". The output of the counting adder 50 is coupled to the second data bus 58.

With this structure, the combinational counter unit 46 provides the functional equivalent of the plurality of counters 38 because each address of the dual-port memory element 48 functions like a counter register to store the count total. And the counting adder 50 can increment the count total by one every time a pixel characteristic value 14 is read. Thus, when a pixel value is read from the input data stream 44, both the first address bus 52 and the second address bus 54 point to the address of the pixel 16 value. The old count total is forwarded through the first data bus 56 to the counting adder 50 and incremented by one. The newly incremented total is then stored in the same address through the second data bus 58.

In various embodiments, the combinational counter unit 46 may include additional look ahead sampling logic to read the pixel 16 values that are behind the current pixel 16 value in the data stream 44. The combinational counter unit 46 may further include logic to adjust the increment value to the counting adder 50 if two or more consecutively read pixel 16 values are the same. Thus, the current address of the dual-port memory element 48 may get incremented by two or more if there are two or more consecutively positioned pixel 16 values of the same value in the data stream 44. This additional logic may help to avoid timing-related problems where the addresses of the dual-port memory element 48 are not incremented properly.

Since each address in the dual-port memory element 48 is a counter 38 that corresponds to the number of values in the range of possible characteristic values for each pixel 16 and there are M possible values, then there are M addresses in the dual-port memory element 48. In the example above, there are 65,536 possible values, so there are 65,536 addresses in the dual-port memory element 48. In turn, there are $\log_2 M$ address lines for the first address bus 52 and the second address bus 54. Thus, in the example, there are $\log_2(65,536)=16$ lines in the first address bus 52 and the second address bus 54. The size of the first address bus 52 and the second address bus 54 generally also corresponds to the number of bits in the input video data stream 44.

The size of each counter 38, or address in the dual-port memory element 48, may be related to the number of pixels 16 in the video frame 18. The purpose of the counters 38 is to keep track of the number of pixels 16 that have a certain value. Since the median 12 is the N/2 element from N sorted elements, then each counter may need only count to N/2. Therefore, each address of the dual-port memory element 48 may hold a count total of N/2. The number of bits for each address may be determined from $\log_2(N/2)$. From the example above, $N=2^{20}$ and $N/2=2^{19}$. Accordingly, $\log_2(2^{19})=19$. Hence, each address in the dual-port memory element 48 includes 19 bits.

Figure 6:
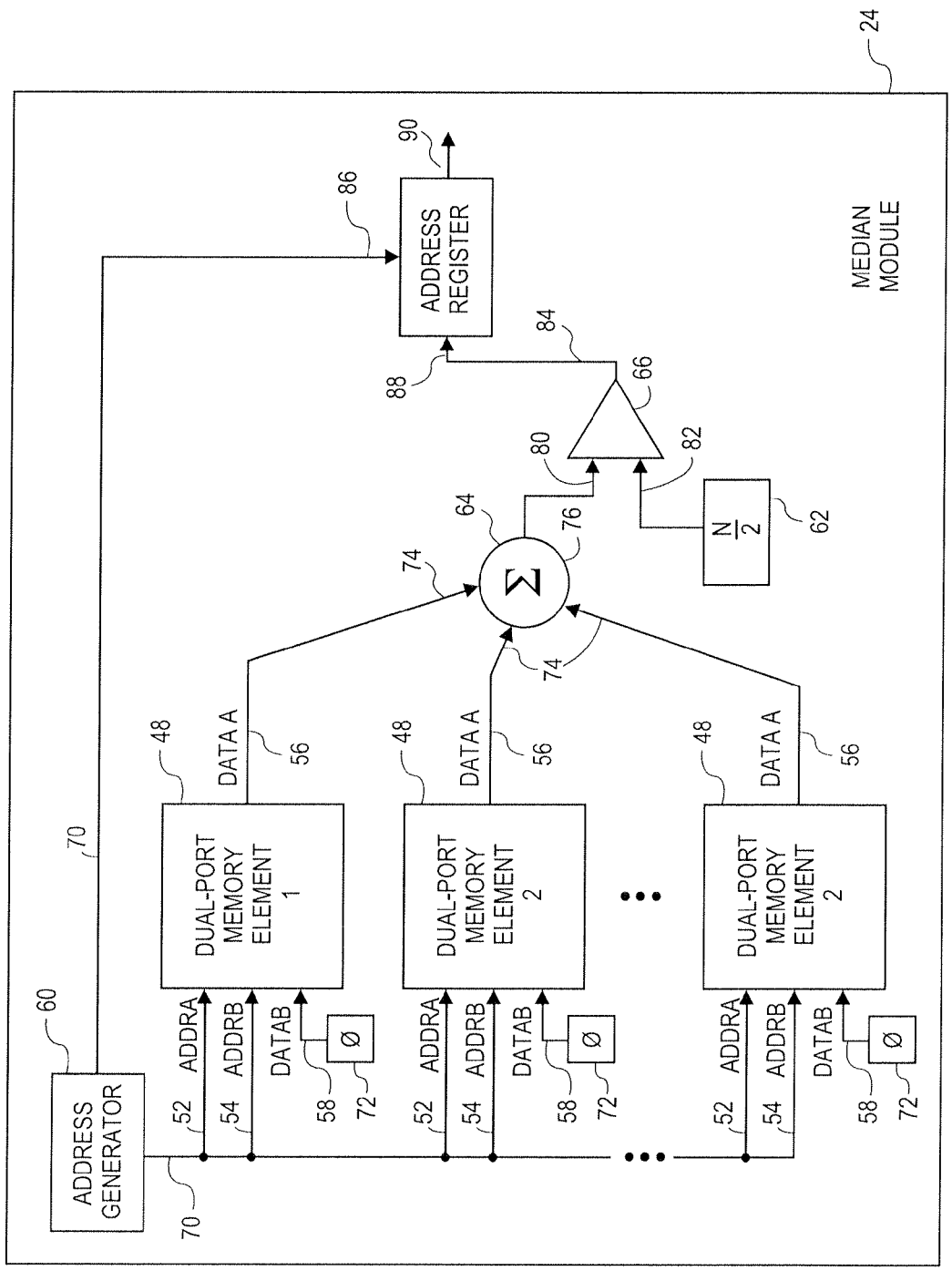
FIG. 6 is a block diagram of the median module that is operating in data analysis mode.

The median module 24 in analysis mode is shown in FIG. 6. The median module 24 may further include an address generator 60, a median index register 62, a median accumulator 64, a median comparator 66, and an address register 68. The median module 24 in analysis mode may also utilize at least one dual-port memory element 48. In various embodiments, the median module 24 may also receive data from a dual-port memory element 48 in another median module 24.

The address generator 60 generally produces every address of the dual-port memory element 48, which represents every value in the range of possible characteristic values for each pixel 16, in sequential order from 0 to M-1. In the example above, the address generator 60 may produce a sequence from 0 to 65,535. Thus, the address generator 60 may include an output 70, with $\log_2 M$ lines (or 16 for the example), that couple directly to the first address bus 52 and the second address bus 54 of the one or more dual-port memory elements 48. In various other embodiments, the address generator 60 may produce only a subset of the total number of addresses of the dual-port memory elements 48 if other statistical values are sought.

The address generator 60 may include logic blocks such as counters, adders, single-bit or multi-bit storage registers, memory cells, shift registers, combinational logic gates, and combinations thereof. Furthermore, the address generator 60 may be implemented through one or more code segments of an HDL.

The first address bus 52 and the second address bus 54 of the dual-port memory element 48 may be connected together and may both couple to the address generator output 70. The first data bus 56 may couple to the median accumulator 64. The second data bus 58 may couple to a zero register 72, which provides a number of registers equal to the size of the second data bus 58, each with a value of zero. The zero register 72 allows each address of the dual-port memory element 48, which functions like a counter 38, to be reset at roughly the same time as the data at each address, which represents each counter 38 total, is forwarded to the median accumulator 64. As a result, each address, or counter 38, is set to zero for the median module 24 to used in collection mode.

The median accumulator 64 generally accumulates the count total from the one or more dual-port memory elements 48. The median accumulator 64 may include a plurality of inputs 74 that are coupled to the first data bus 56 of each dual-port memory element 48. The median accumulator 64 may also include an output 76, which represents the accumulated count total, that is coupled to the median comparator 66.

The median accumulator 64 may include one or more adding elements coupled to one or more storage registers, so as to provide an accumulating function. Hence, the sum outputs of the adding elements may be coupled to the inputs of the registers, while the outputs of the registers are coupled to the inputs of the adding elements, along with the first data bus 56 of each dual-port memory element 48. As a result, the median accumulator 64 may include half adders, full adders, carry look ahead adders, or other generally known adders, as well as storage registers such as flip flops or memory cells, in addition to control logic elements, such as finite state machines and the like, to control the flow of data and the timing of the accumulate operation. Furthermore, the median accumulator 64 may be implemented from one or more code segments of an HDL.

The median index register 62 generally contains the value of the desired index of the array 34 of pixel 16 values from each frame 18 of video data. In this instance, the median 12 is to be determined from N elements, therefore the value of the N/2 element is desired. Accordingly, N/2 is stored in the median index register 62. In the above example, $N/2=2^{19}$.

The median index register 62 may include a median index register output 78 and be formed from generally known storage registers such as flip flops, memory cells, and the like. In addition, the median index register 62 may be implemented from one or more code segments of an HDL.

The median comparator 66 generally compares the accumulated count total from the median accumulator 64 with the median 12 index from the median index register 62. Thus, the median comparator 66 may include a first input 80 coupled to the median accumulator output 76 and a second input 82 coupled to the median index register output 78. The median comparator 66 may generate a median comparator output 84 based on the relative values of the median comparator first input 80 and the median comparator second input 82. For example, the median comparator 66 may output a certain value, perhaps a zero, if the median accumulator output 76 is less than the median index register 62. The median comparator 66 may output a different value, perhaps a one, if the median accumulator output 76 is greater than or equal to the median index register 62.

The median comparator 66 may include one or more comparative elements and may be formed from combinational logic gates or generally known comparators, as well as registers and control logic elements. In addition, the median comparator 66 may be implemented from one or more code segments of an HDL.

The address register 68 generally tracks the address of the currently accumulated count total. The address register 68 may include an address register first input 86 that is coupled to the address generator output 70 that receives the address of the dual-port memory elements 48 that are currently being accumulated. The address register 68 may include an address register second input 88 that is coupled to the median comparator output 84 and receives a signal when the accumulated count total is equal to or greater than the median 12 index (N/2), indicating that the median 12 value has been ascertained. The address register may further include an address register output 90 that transmits the median 12 value to the output transfer module 28. In various embodiments, the address register 68 may also output a flag or similar signal to indicate when the median 12 has been ascertained.

The address register 68 may be formed from generally known storage registers such as flip flops, memory cells, and the like. In addition, the address register 68 may be implemented from one or more code segments of an HDL.

The inter FPGA link 26 generally allows communication from the components, such as the input router 22 or the median module 24, on one FPGA 20 to the components on another FPGA 20. The inter FPGA link 26 may buffer the data and add packet data, serialize the data, or otherwise prepare the data for transmission.

The inter FPGA link 26 may include buffers in the form of flip-flops, latches, registers, SRAM, DRAM, and the like, as well as shift registers or SERDES components. The inter FPGA link 26 may be a built-in functional FPGA block or may be formed from one or more code segments of an HDL or one or more schematic drawings. The inter FPGA link 26 may also be compatible with or include Gigabit Transceiver (GT) components, as are known in the art. The inter FPGA link 26 may couple to the input router 22, the median module 24, or the output transfer module 28 within an FPGA 20. The inter FPGA link 26 may couple to an inter FPGA bus 92 to communicate with another FPGA 20.

The inter FPGA bus 92 generally carries data from one FPGA 20 to another FPGA 20 and is coupled with the inter FPGA link 26 of each FPGA 20. The inter FPGA bus 92 may be a single-channel serial line, wherein all the data is transmitted in serial fashion, a multi-channel (or multi-bit) parallel link, wherein different bits of the data are transmitted on different channels, or variations thereof, wherein the inter FPGA bus 92 may include multiple lanes of bidirectional data links. The inter FPGA bus 92 may be compatible with GTP components included in the inter FPGA link 26. The inter FPGA link 26 and the inter FPGA bus 92 may also be implemented as disclosed in U.S. Pat. No. 7,444,454, issued Oct. 28, 2008, which is hereby incorporated by reference in its entirety.

The output transfer module 28 generally transfers the median 12 to one or more external destinations, or in some embodiments, to other FPGAs 20. The output transfer module 28 may also transfer performance statistics of the collection and analysis processes to external destinations. The output transfer module 28 may include multiplexers, demultiplexers, storage registers or buffers, shift registers, other SERDES components, and combinations thereof, and may also be implemented through one or more code segments of an HDL.

The median determining system 10 may operate as follows. The input router 22 may receive one frame 18 of characteristic values 14 from an external source. In various embodiments, the input router 22 may receive more than one frame 18 of characteristic values 14. The input router 22 may split the frame 18 into one or more data streams 44 to be routed to one or more median modules 24. There may be more than one counter 38, and in turn more than one dual-port memory element 48, for each possible characteristic value 14 in a single frame 18 during the data collection phase. Furthermore, it is possible that each dual-port memory element 48 receives a different portion of the frame 18 data or receives the data at a different rate. However, the same address from all the dual-port memory elements 48 that are operating on the same frame 18 of data must be accessed and accumulated at the same time.

The system 10 typically includes two or more median modules 24 operating simultaneously. At least one or more median module 24 is operating in data collection mode, receiving one or more data streams 44 from the input router 22. At least one or more median module 24 is operating in data analysis mode, determining the median 12 of the frame 18 of video data.

When in data collection mode, the median module 24 receives at least one data stream 44 from the input router 22. The data may be received in any order. For example, the characteristic value 14 from the first pixel 16 in the frame may be received first. Or, the characteristic value 14 from the last pixel 16 in the frame may be received first. Each characteristic value 14 accesses the appropriate address in the dual-port memory element 48. The data value at that address, which is the count total for that particular characteristic value, is read, has one added to it, and the sum is stored in the same address—thereby effectively incrementing the count total by one. This incrementing process continues until all N pixel 16 values for a single frame 18 are read and the data at the appropriate addresses of each dual-port memory element 48 is incremented. Thus ends data collection mode.

The median modules 24 that are operating on the same frame 18 of video data now switch to data analysis mode. The address generator 60 generates addresses, which are also the values in the range of all possible characteristic values 14, in sequence from 0 to M-1. The addresses from the address generator 60 are also forwarded to the address register 68 and stored. For each address generated, the data at that address for each dual-port memory element 48 is accumulated by the median accumulator 64. At roughly the same time, the data at that address is reset to zero. The median comparator 66 compares the accumulated count total from the median accumulator 64 with the median index, which is N/2. If the accumulated count total is equal to or greater than N/2, then the median comparator 66 generates a signal for the address generator 60 indicating that the current address is the median 12 value. The address register 68 forwards the median value 12 to the output transfer module 28, which may send the median 12, along with performance statistics to an external destination. If the accumulated count total is less than N/2, the next address in each dual-port memory element 48 is accessed and each count total is accumulated. The process continues until the median 12 is determined.

Although the invention has been described herein as being directed toward ascertaining the median of a characteristic value in a frame of video data, the system 10 and methods may be generally applied to any environment wherein ascertaining the median or similar statistical value may be required.

Furthermore, although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for determining the median of a plurality of data values, the system comprising:
    a processor and a memory element communicatively coupled thereto, the memory element configured to store a plurality of instructions to be executed by the processor for determining the median of a plurality of data values;

a plurality of field programmable gate arrays (FPGA) including a plurality of configurable logic elements and a plurality of configurable storage elements;

an input router formed from the configurable logic elements and configured to receive the data values and create a plurality of data streams, each data stream including a portion of the data values; and a plurality of median modules formed from the configurable logic elements and the configurable storage elements and configured to receive at least one data stream, each median module including a plurality of counters, each counter with an address corresponding to a single data value within the range of data values and each counter being incremented when the corresponding data value is received, an accumulator configured to accumulate the contents of each counter in sequential order, a comparator configured to compare the contents of the accumulator with the total number of the data values divided by two, wherein the comparator generates a signal if the contents of the accumulator is greater than or equal to the total number of the data values divided by two, and an address register coupled to the comparator, the address register configured to track the address of the counters as the contents of each counter are accumulated and to determine the median upon receipt of the signal from the comparator.

2. The system of claim 1, further including a plurality of inter FPGA links, each inter FPGA link included within one FPGA and configured to allow communication from one FPGA to another FPGA.

3. The system of claim 1, further including a plurality of output transfer modules, each output transfer module included within one FPGA and configured to transfer the median to an external destination along with performance statistics of the determination of the median.

4. The system of claim 1, wherein the plurality of counters includes at least one dual-port memory element coupled to an adder, wherein the adder is configured to add one to the contents of each address of the at least one dual-port memory element.

5. The system of claim 4, wherein each dual-port memory element includes an address to correspond to each data value in the range of data values.

6. The system of claim 4, wherein the accumulator is coupled to a data bus of the at least one dual-port memory element and configured to accumulate the contents of each address of the at least one dual-port memory element in sequential order.

7. The system of claim 6, wherein the contents of each address of the at least one dual-port memory element are reset to zero at the same time as the contents of each address are accumulated.

8. The system of claim 4, wherein each median module further includes an address generator coupled to an address bus of the at least one dual-port memory elements and configured to generate each address of the at least one dual-port memory element in sequential order.

9. A system for determining the median of a plurality of data values, the system comprising:

a processor and a memory element communicatively coupled thereto, the memory element configured to store a plurality of instructions to be executed by the processor for determining the median of a plurality of data values;

a plurality of field programmable gate arrays (FPGA) including a plurality of configurable logic elements and a plurality of configurable storage elements;

a plurality of inter FPGA links, each inter FPGA link included within one FPGA and configured to allow communication from one FPGA to another FPGA;

an input router formed from the configurable logic elements and is configured to receive the data values and create a plurality of data streams, each data stream including a portion of the data values;

a plurality of median modules formed from the configurable logic elements and the configurable storage elements and configured to receive at least one data stream, each median module including a plurality of counters, each counter corresponding to a single data value within the range of data values and each counter being incremented when the corresponding data value is received, an accumulator configured to accumulate the contents of each counter in sequential order, a comparator configured to compare the contents of the accumulator with the total number of the data values divided by two, wherein the comparator generates a signal if the contents of the accumulator is greater than or equal to the total number of the data values divided by two, and an address register coupled to the comparator, the address register configured to track the address of the counters as the contents of each counter are accumulated and to determine the median upon receipt of the signal from the comparator; and a plurality of output transfer modules, each output transfer module included within one FPGA and configured to transfer the median to an external destination along with performance statistics of the determination of the median.

10. The system of claim 9, wherein the plurality of counters includes at least one dual-port memory element coupled to an adder, wherein the adder is configured to add one to the contents of each address of the at least one dual-port memory element.

11. The system of claim 10, wherein the at least one dual-port memory element includes an address to correspond to each data value in the range of data values.

12. The system of claim 10, wherein the accumulator is coupled to a data bus of the at least one dual-port memory element and configured to accumulate the contents of each address of the at least one dual-port memory element in sequential order.

13. The system of claim 10, wherein each median module further includes an address generator coupled to an address bus of the at least one dual-port memory elements and configured to generate each address of the at least one dual-port memory element in sequential order.

14. A system for determining the median of a plurality of data values, the system comprising:

a processor and a memory element communicatively coupled thereto, the memory element configured to store a plurality of instructions to be executed by the processor for determining the median of a plurality of data values;

a plurality of field programmable gate arrays (FPGA) including a plurality of configurable logic elements and a plurality of configurable storage elements;

a plurality of inter FPGA links, each inter FPGA link included within one FPGA and configured to allow communication from one FPGA to another FPGA;

an input router formed from the configurable logic elements and is configured to receive the data values and create a plurality of data streams, each data stream including a portion of the data values;

a plurality of median modules formed from the configurable logic elements and the configurable storage elements and configured to receive at least one data stream, and further including at least one dual-port memory element coupled to an adder, wherein the adder is configured to add one to the contents of each address of the at least one dual-port memory element, an address generator coupled to an address bus of the at least one dual-port memory element and configured to generate each address of the at least one dual-port memory element in sequential order, an accumulator coupled to a data bus of the at least one dual-port memory element and configured to accumulate the contents of each address of the at least one dual-port memory element in sequential order, a comparator configured to compare the contents of the accumulator with the total number of the data values divided by two and to generate a signal if the contents of the accumulator is greater than or equal to the total number of the plurality of data values divided by two, and an address register coupled to the comparator, the address register configured to track the address of the counters as the contents of each counter are accumulated and to determine the median upon receipt of the signal from the comparator; and a plurality of output transfer modules, each output transfer module included within one FPGA and configured to transfer the median to an external destination along with performance statistics of the determination of the median.

15. A computer implemented method for determining the median of a plurality of data values, the method comprising the steps of:

a) establishing a processor and a memory element communicatively coupled thereto, the memory element configured to store a plurality of instructions to be executed by the processor for determining the median of a plurality of data values;

b) establishing at least one dual-port memory element within a field programmable gate array (FPGA) wherein the at least one dual-port memory element includes an address that corresponds to each value in the range of data values;

c) receiving all of the data values into the FPGA;

d) counting the occurrence of each data value in the data values by incrementing the contents of the address that corresponds to the data value;

e) sequentially accumulating the contents of each address of the at least one dual-port memory element utilizing an accumulator within the FPGA;

f) comparing the contents of the accumulator after each address is accumulated with the total number of the data values divided by two after each address is accumulated utilizing a comparator within the FPGA; and g) generating the median as being the current address of the at least one dual-port memory element when the contents of the accumulator equals the total number of the data values divided by two.

16. The method of claim 15, further including the step of splitting the plurality of data values into a plurality of data streams within the FPGA to be received by the at least one dual-port memory element.

17. The method of claim 15, further including the step of resetting the contents of each address of the at least one dual-port memory element to zero at the same time as the contents of each address is accumulated.

18. The method of claim 15, wherein incrementing the contents of the address that corresponds to the data value of step c) utilizes an adder coupled with the dual-port memory element.

* * * * *